United States Patent
Fu et al.

(10) Patent No.: US 10,820,098 B2
(45) Date of Patent: Oct. 27, 2020

(54) WIRELESS MICROPHONE SYSTEM, CONTROL METHOD AND AUDIO-VIDEO CONFERENCE SYSTEM

(71) Applicant: YEALINK (XIAMEN) NETWORK TECHNOLOGY CO., LTD., Xiamen (CN)

(72) Inventors: Siyu Fu, Xiamen (CN); Zongyan Lin, Xiamen (CN); Chongchao Gong, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/596,786

(22) Filed: Oct. 9, 2019

(65) Prior Publication Data
US 2020/0137490 A1    Apr. 30, 2020

(30) Foreign Application Priority Data
Oct. 31, 2018   (CN) .......................... 2018 1 1292847

(51) Int. Cl.
H04R 3/00      (2006.01)
G10L 15/22     (2006.01)
H04R 1/40      (2006.01)

(52) U.S. Cl.
CPC .............. *H04R 3/005* (2013.01); *G10L 15/22* (2013.01); *H04R 1/406* (2013.01); *H04R 2420/07* (2013.01)

(58) Field of Classification Search
CPC .... H04R 2420/07; H04R 1/406; H04R 3/005; G10L 15/22
See application file for complete search history.

(56) References Cited

U.S. PATENT DOCUMENTS

| 2006/0017805 A1 | 1/2006 | Rodman |
| 2016/0094648 A1* | 3/2016 | Han .................... H04W 12/003 709/209 |
| 2017/0034618 A1 | 2/2017 | Negi |

FOREIGN PATENT DOCUMENTS

| CN | 101047408 A | 10/2007 |
| CN | 203086714 U | 7/2013 |
| CN | 203827453   | * 9/2014 |

(Continued)

*Primary Examiner* — Regina N Holder
(74) *Attorney, Agent, or Firm* — Yu Gang

(57) ABSTRACT

The present disclosure discloses a wireless microphone system, which includes a host, a wireless communication component and multiple wireless microphones. The host includes a wireless signal processing component and an audio signal processing component. Each wireless microphone is configured to acquire a sound signal, convert the sound signal into an audio signal and wirelessly transmit the audio signal to the wireless communication component. The wireless communication component is configured to send the audio signal to the host. The wireless signal processing component is configured to receive the audio signal from the wireless communication component, perform signal processing on the audio signal to obtain speech data and send the speech data to the audio signal processing component. The audio signal processing component is configured to receive the speech data and perform data processing on the speech data to obtain sound data to be played for network transmission.

9 Claims, 4 Drawing Sheets

(56) References Cited

FOREIGN PATENT DOCUMENTS

| | | |
|---|---|---|
| CN | 104093174 A | 10/2014 |
| CN | 205563191 U | 9/2016 |
| CN | 206272635 U | 6/2017 |
| CN | 207266226 U | 4/2018 |
| CN | 207266265 U | 4/2018 |
| EP | 2521376 A2 | 11/2012 |
| EP | 2651071 A1 | 10/2013 |
| WO | 2017171756 A1 | 10/2017 |

\* cited by examiner

WIRELESS MICROPHONE SYSTEM, CONTROL METHOD AND AUDIO-VIDEO CONFERENCE SYSTEM

TECHNICAL FIELD

The present disclosure relates to the technical field of communication, and in particular to a wireless microphone system, a control method and an audio-video conference system.

BACKGROUND

At present, an audio or video conference host system mainly adopts a microphone and a loudspeaker as carriers for sound signal transmission. When the audio or video conference host system is used for an occasion such as a medium and large conference room, for meeting requirements, multiple extended microphones are usually connected with a host due to limits of a pick-up distance of the microphone. However, a connection manner for adopting the multiple extended microphones is usually a wired connection, and this wired connection manner for the multiple extended microphones may have problems of difficulties in wiring, inflexibility in movement and the like.

SUMMARY

At least some embodiments of the present disclosure provide a wireless microphone system, a control method and an audio-video conference system, so as at least to partially solve technical problems of difficulties in wiring and inflexibility in movement caused by a wired connection between multiple microphones and a host in an existing audio-video conference system, thereby implementing a wireless communication connection between the multiple microphones and the host, avoiding a constraint of the wired connection and further facilitating improvement in user experiences.

For solving the technical problems, an embodiment of the present disclosure provides a wireless microphone system, which includes a host, a wireless communication component and multiple wireless microphones, and the host includes a wireless signal processing component and an audio signal processing component.

Each wireless microphone of the multiple wireless microphones is configured to acquire a sound signal and convert the sound signal into an audio signal and wirelessly transmit the audio signal to the wireless communication component.

The wireless communication component is configured to send the received audio signal to the host.

The wireless signal processing component is configured to receive the audio signal from the wireless communication component, perform signal processing on the audio signal to obtain speech data and send the speech data to the audio signal processing component.

The audio signal processing component is configured to receive the speech data and perform data processing on the speech data to obtain sound data to be played for network transmission.

Furthermore, the wireless communication component includes a Bluetooth component.

Furthermore, each wireless microphone includes a pick-up, an audio signal processing circuit and a wireless signal transmission component, an output end of the pick-up is connected with an input end of the audio signal processing circuit, an output end of the audio signal processing circuit is connected with the wireless signal transmission component, and the wireless signal transmission component is wirelessly connected with the wireless communication component.

Furthermore, the Bluetooth component is a built-in Bluetooth chip, and the built-in Bluetooth chip is connected with the wireless signal processing component; and the wireless signal transmission component of each wireless microphone is wirelessly connected with the built-in Bluetooth chip.

Furthermore, the Bluetooth component is an external Bluetooth adapter, and the external Bluetooth adapter is connected with the wireless signal processing component through a data interface in the host; and the wireless signal transmission component of each wireless microphone is wirelessly connected with the external Bluetooth adapter.

Furthermore, each wireless microphone further includes a wireless signal receiving component and a state controller configured to control power-on/off and a state of an indicator lamp, the wireless signal receiving component is wirelessly connected with the Bluetooth component, and an output end of the wireless signal receiving component is connected with the state controller.

For solving the same technical problems, another embodiment of the present disclosure provides a control method for the abovementioned wireless microphone system, which includes the following steps:

the Bluetooth component numbers the multiple wireless microphones successfully paired with the Bluetooth component according to a preset connection sequence;

the Bluetooth component establishes an audio data channel between each wireless microphone and the Bluetooth component, and the audio data channel is configured to transmit a path of coded and compressed Wideband Speech (WBS) data; and the Bluetooth component receives audio signals sent by the multiple wireless microphones and sequentially sends an audio signal corresponding to each wireless microphone to the host according to numbers of the multiple wireless microphones.

Furthermore, after the operation that the Bluetooth component receives audio signals sent by the multiple wireless microphones and sequentially sends an audio signal corresponding to each wireless microphone to the host according to numbers of the multiple wireless microphones, the method further includes the following steps:

the wireless signal processing component performs signal processing on the sequentially received audio signal to obtain speech data and sends the speech data to the audio signal processing component; and the audio signal processing component performs data processing on the sequentially received speech data to obtain sound data to be transmitted through a network to a loudspeaker on the host and played by the loudspeaker.

Furthermore, the operation that the wireless signal processing component performs signal processing on the sequentially received audio signal to obtain the speech data and sends the speech data to the audio signal processing component includes the following steps:

the wireless signal processing component decodes the sequentially received audio signal to obtain the speech data, caches the speech data, packs the speech data sent by each wireless microphone in the same time period in a Real Time Protocol (RTP) packet format and forwards the packed speech data to the audio signal processing component.

For solving the same technical problems, another embodiment of the present disclosure provides an audio-video conference system, which includes the abovementioned wireless microphone control system.

Compared with a related art, the at least some embodiments of the present disclosure have the following beneficial effects.

The at least some embodiments of the present disclosure provide a wireless microphone system, which includes a host, a wireless communication component and multiple wireless microphones, and the host includes a wireless signal processing component and an audio signal processing component. Each wireless microphone is configured to acquire a sound signal, convert the sound signal into an audio signal and wirelessly transmit the audio signal to the wireless communication component. The wireless communication component is configured to send the audio signal to the host. The wireless signal processing component is configured to receive the audio signal from the wireless communication component, perform signal processing on the audio signal to obtain speech data and send the speech data to the audio signal processing component. The audio signal processing component is configured to receive the speech data and perform data processing on the speech data to obtain sound data to be played for network transmission. Through the wireless communication component, wireless connection between each wireless microphone and the host is implemented, thereby achieving a purpose of connecting the multiple wireless microphones to the same host, further implementing wireless communication connection between each wireless microphone and the host, avoiding the constraints of wires and facilitating improvement in user experiences.

REFERENCE SIGNS IN THE DRAWINGS OF THE SPECIFICATION

1: host; 11: wireless signal processing component; 12: audio signal processing component; 2: wireless communication component; and 3: wireless microphone.

DETAILED DESCRIPTION

The technical solutions in the embodiments of the present disclosure will be described clearly and completely below in combination with the drawings in the embodiments of the present disclosure. It is apparent that the described embodiments are not all embodiments but only part of embodiments of the present disclosure. All other embodiments obtained by those of ordinary skill in the art based on the embodiments in the present disclosure without creative work shall fall within the scope of protection of the present disclosure.

Figure 1:
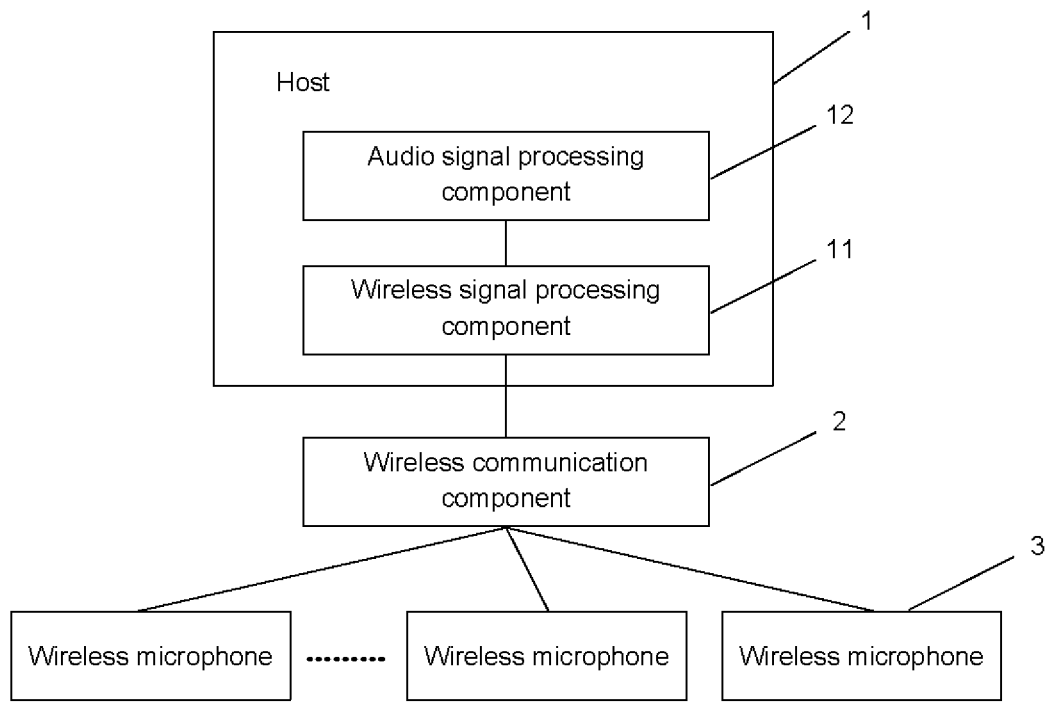
FIG. 1 is a structural schematic diagram of a wireless microphone system according to a first embodiment of the present disclosure.

As shown in FIG. 1, an embodiment of the present disclosure provides a wireless microphone system, which includes a host 1, a wireless communication component 2 and multiple wireless microphones 3, and the host 1 includes a wireless signal processing component 11 and an audio signal processing component 12.

Each wireless microphone 3 of the multiple wireless microphones 3 is configured to acquire a sound signal, convert the sound signal into an audio signal and wirelessly transmit the audio signal to the wireless communication component.

The wireless communication component 2 is configured to send the received audio signal to the host 1.

The wireless signal processing component 11 is configured to receive the audio signal from the wireless communication component 2, perform signal processing on the audio signal to obtain speech data and send the speech data to the audio signal processing component 12.

The audio signal processing component 12 is configured to receive the speech data and perform data processing on the speech data to obtain sound data to be played for network transmission. The sound data is transmitted through the network to at least one remote audio-video conference device for playing, and the at least one remote audio-video conference device includes, but not limited to, a Personal Computer (PC), a phone and a mobile phone.

In the embodiment of the present disclosure, through the wireless communication component 2, wireless connection between each wireless microphone 3 and the host 1 is implemented, thereby achieving the purpose of connecting the multiple wireless microphones 3 to the same host 1, further implementing wireless communication connection between each wireless microphone and the host 1, avoiding the constraints of wires and facilitating improvement in user experiences.

In the embodiment of the present disclosure, the wireless communication component 2 includes, but not limited to, a Bluetooth component, a Dect component and a Wireless Fidelity (Wi-Fi) component. Bluetooth is a mature wireless transmission technology. In the present disclosure, by use of a Bluetooth technology, the host 1 may be wirelessly connected with multiple extended microphones, so that problems of wired microphones in the related art are effectively solved. The host 1 refers to a computer host 1 or an embedded system host 1.

In the embodiment of the present disclosure, it is to be noted that each wireless microphone 3 includes a pick-up, an audio signal processing circuit and a wireless signal transmission component, an output end of the pick-up is connected with an input end of the audio signal processing circuit, an output end of the audio signal processing circuit is connected with the wireless signal transmission component, and the wireless signal transmission component is wirelessly connected with the wireless communication component 2.

In the embodiment the present disclosure, the host 1 supports transmission and reception of Bluetooth data through a built-in Bluetooth chip or an external Bluetooth Universal Serial Bus (USB) adapter. The built-in Bluetooth chip communicates with the host through a serial port, and the external Bluetooth adapter communicates with the host 1 through a USB interface. The following connection manner is specifically adopted.

Figure 2:
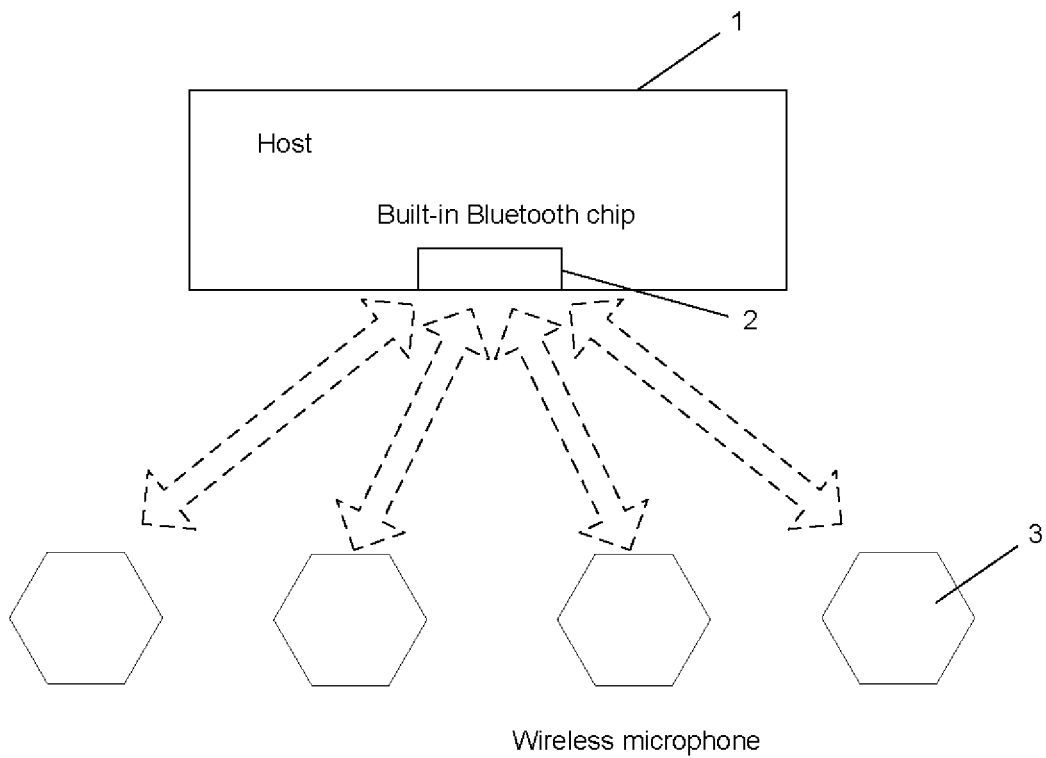
FIG. 2 is a structural schematic diagram of a built-in Bluetooth chip of a wireless microphone system according to a first embodiment of the present disclosure.

As shown in FIG. 2, the Bluetooth component is a built-in Bluetooth chip, and the built-in Bluetooth chip is connected with the wireless signal processing component 11. And the wireless signal transmission component of each wireless microphone 3 is wirelessly connected with the built-in Bluetooth chip.

Figure 3:
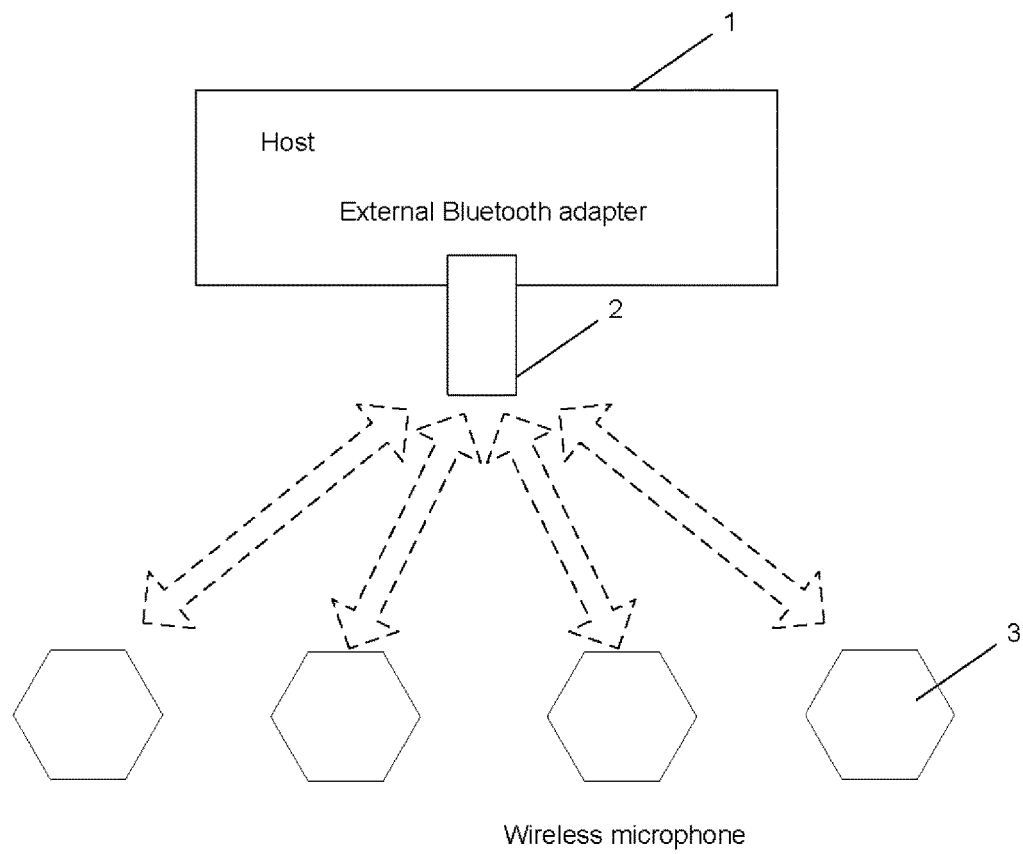
FIG. 3 is a structural schematic diagram of an external Bluetooth adapter of a wireless microphone system according to a first embodiment of the present disclosure.

As shown in FIG. 3, the Bluetooth component is an external Bluetooth adapter, and the external Bluetooth adapter is connected with the wireless signal processing component through a data interface in the host 1. And the wireless signal transmission component of each wireless microphone 3 is wirelessly connected with the external Bluetooth adapter.

It can be understood that adopting the Bluetooth component can effectively implement connection between the host 1 and each of the multiple (two or more than two) wireless microphones 3 supporting Bluetooth through the Bluetooth component, thereby implementing the wireless communication connection between each microphones and the host 1, avoiding the constraints of the wires and facilitating improvement in the user experiences.

Figure 4:
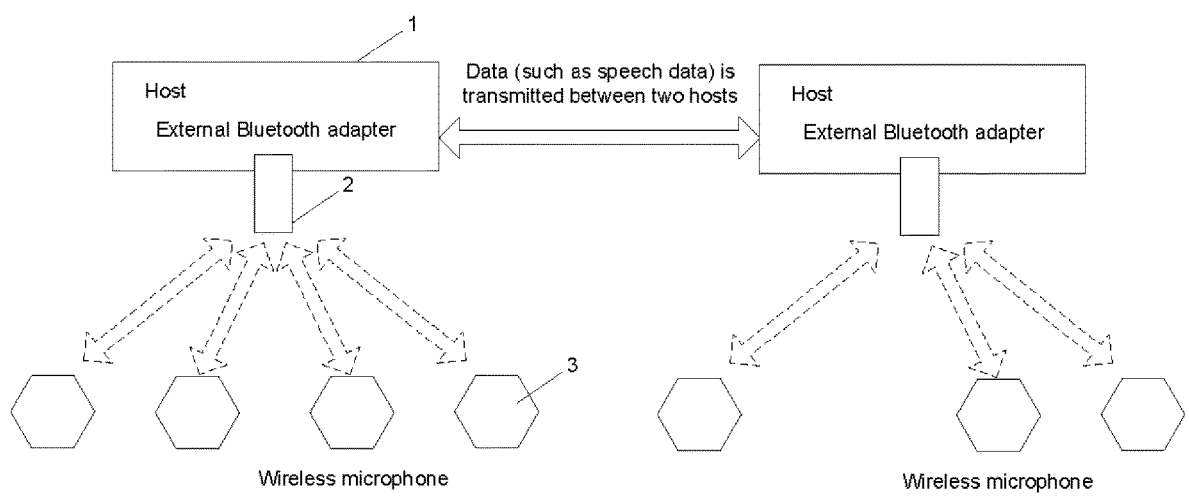
FIG. 4 is a structural schematic diagram of two hosts of a wireless microphone system according to a first embodiment of the present disclosure.

As shown in FIG. 4, in the embodiment of the present disclosure, each wireless microphone 3 further includes a wireless signal receiving component and a state controller configured to control power-on/off and a state of an indicator lamp. The wireless signal receiving component is wirelessly connected with the Bluetooth component, and an output end of the wireless signal receiving component is connected with the state controller.

Figure 5:
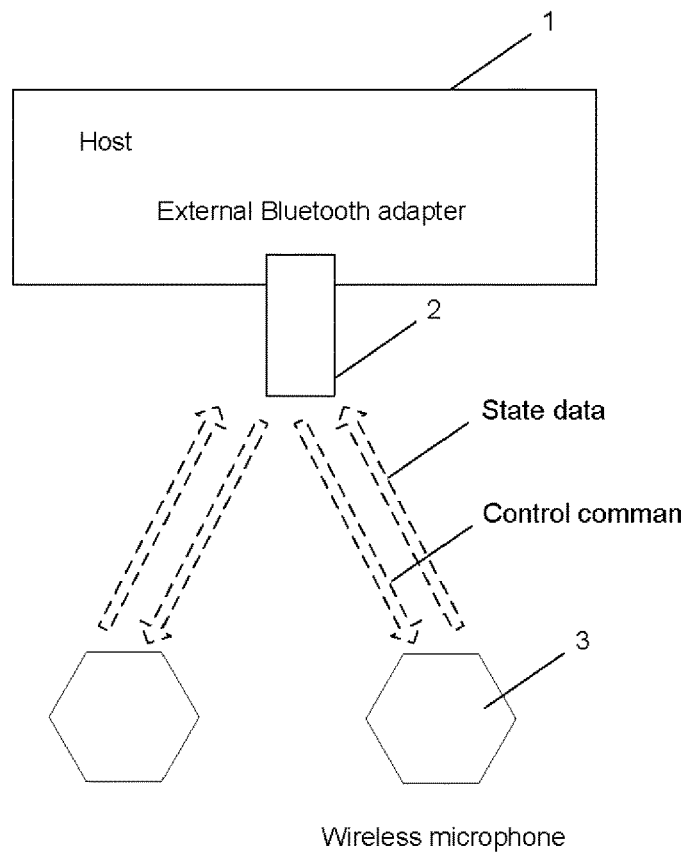
FIG. 5 is a structural schematic diagram of bidirectional signal transmission of a wireless microphone system according to a first embodiment of the present disclosure.

As shown in FIG. 5, in the embodiment of the present disclosure, a control command and state data may be bidirectionally transmitted between the host 1 and each wireless microphone 3. The host 1 may control states of all the wireless microphones 3, and the state data of the multiple wireless microphones 3 may be summarized to the host 1.

The wireless microphone 3 integrates components such as a Bluetooth transceiver component, a battery and power detection component, Light-Emitting Diode (LED) lamps and a touch button, as well as a Micro Control Unit (MCU) configured to control the above-mentioned components. The MCU of each wireless microphone 3 summarizes information such as power information reported by the power detection component, a touch event reported by the touch button and on/off states of the LED lamps, then structures the summarized information into Sequential Packet Protocol (SPP) data according to a predetermined protocol and sends the SPP data to the host 1 through a Bluetooth transceiver.

The Bluetooth transceiver of each wireless microphone 3, after receiving a control message from the host 1, forwards the control message to the MCU, and the MCU controls turning-on/off of each LED lamp, power-on/off and the like according to the control message.

As shown in FIG. 5, in the embodiment of the present disclosure, a high-quality and low-latency wideband voice may further be transmitted between the wireless microphone 3 and the host 1. A voice sampling rate reaches 16 KHz and a latency is less than 100 ms. The speech data of the multiple wireless microphones 3 may be simultaneously transmitted to the host 1. The host 1 may process the speech data and send to the processed speech data another host 1 or play the processed speech data.

Figure 6:
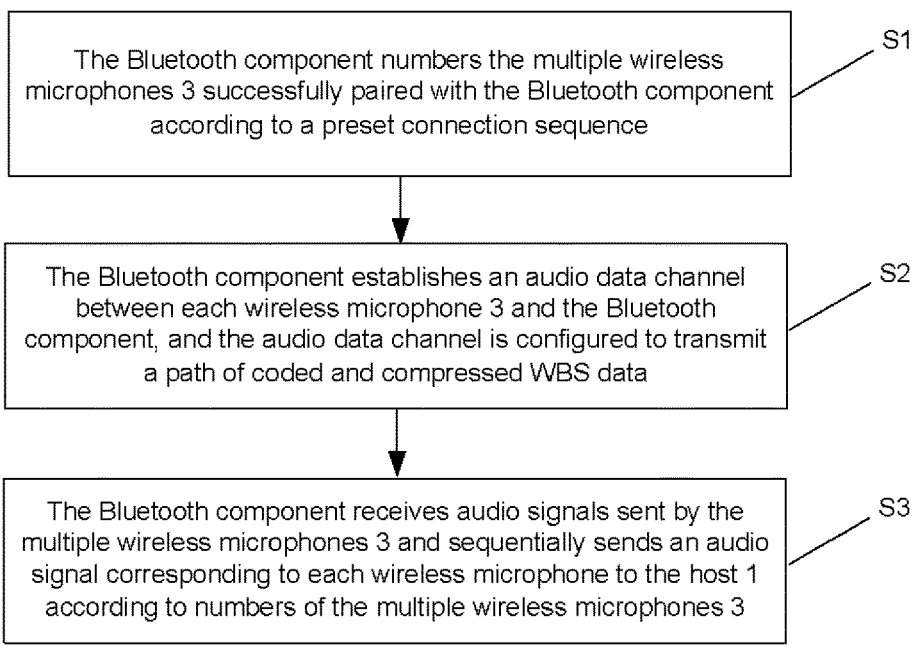
FIG. 6 is a flowchart of a control method for a wireless microphone system according to a second embodiment of the present disclosure.
Figure 7:
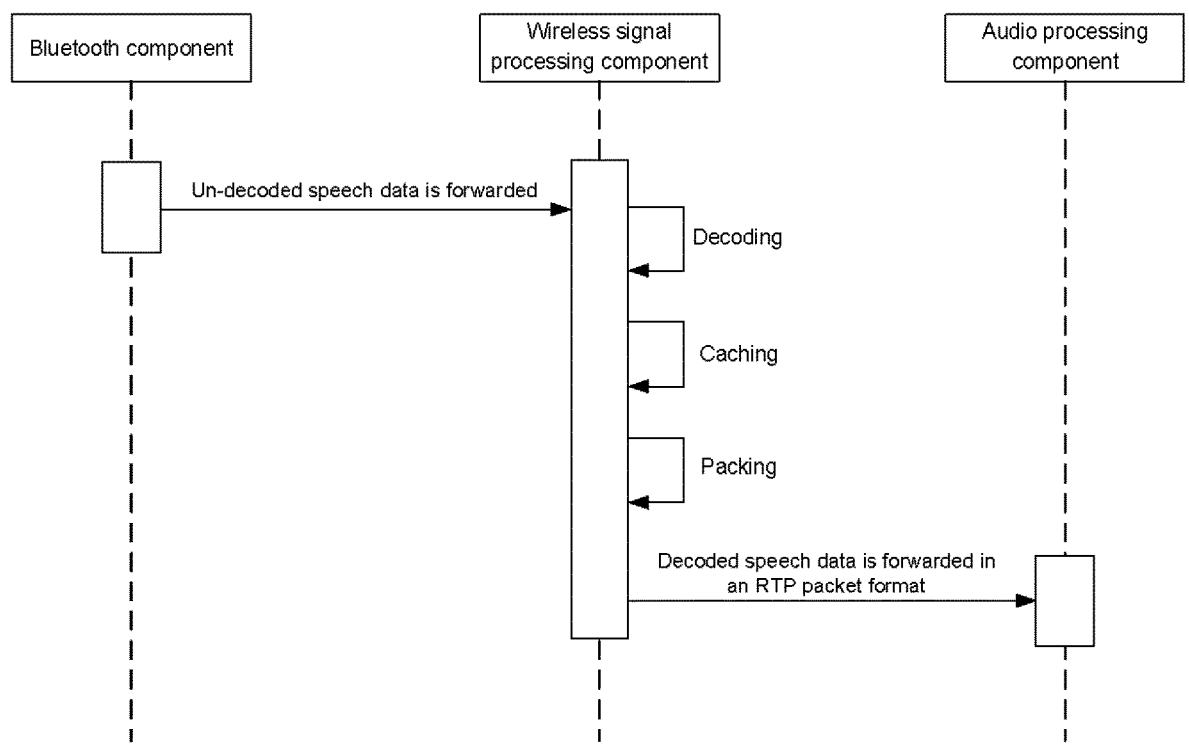
FIG. 7 is a schematic diagram of signal transmission of a wireless microphone system according to a second embodiment of the present disclosure.

As shown in FIG. 6 and FIG. 7, another embodiment of the present disclosure provides a control method for the abovementioned wireless microphone system, which includes the following steps.

At step S1, the Bluetooth component numbers the multiple wireless microphones 3 successfully paired with the Bluetooth component according to a preset connection sequence.

At step S2, the Bluetooth component establishes an audio data channel between each wireless microphone 3 and the Bluetooth component, and the audio data channel is configured to transmit a path of coded and compressed WBS data.

At step S3, the Bluetooth component receives audio signals sent by the multiple wireless microphones 3 and sequentially sends an audio signal corresponding to each wireless microphone to the host 1 according to numbers of the multiple wireless microphones 3.

In the embodiment of the present disclosure, after the operation that the Bluetooth component receives the audio signals sent by the multiple wireless microphones 3 and sequentially sends ends an audio signal corresponding to each wireless microphone to the host according to numbers of the multiple wireless microphones 3, the method further includes the following steps.

The wireless signal processing component 11 performs signal processing on the sequentially received audio signal to obtain speech data and sends the speech data to the audio signal processing component 12.

The audio signal processing component 12 performs data processing on the sequentially received speech data to obtain sound data to be transmitted through a network to a loudspeaker on the host and played by the loudspeaker.

In the embodiment of the present disclosure, the operation that the wireless signal processing component 11 performs signal processing on the sequentially received audio signal to obtain the speech data and sends the speech data to the audio signal processing component 12 includes the following steps.

The wireless signal processing component 11 decodes the sequentially received audio signal to obtain the speech data, caches the speech data, packs the speech data sent by each wireless microphone in the same time period in a RTP packet format and forwards the packed speech data to the audio signal processing component 12.

As shown in FIG. 7, in the embodiment, it is to be noted that the host 1 numbers each wireless microphone 3 according to the Bluetooth connection sequence, the Bluetooth component sequentially forwards the speech data received from each wireless microphone 3 to the wireless signal processing component 11 of the host 1 after a Bluetooth audio connection is established between the host 1 and the wireless microphone 3. And the wireless signal processing component 11 decodes and caches the received speech data, then packs the speech data of each microphone in the same time period in the RTP packet format and finally forwards the packed speech data to the audio processing component on the host 1.

An implementation idea of simultaneously transmitting multiple paths of wideband voices is sequential reception, decoding and caching and then unified forwarding, specifically as follows.

An audio data channel may be established between the Bluetooth component and each connected microphone to transmit a path of coded and compressed WBS data.

The Bluetooth component is connected with the multiple wireless microphones 3 to establish multiple audio data channels to transmit multiple paths of WBS data, and the Bluetooth component sequentially receives each path of WBS data and forwards the received WBS data to the wireless signal processing component 11 of the host 1.

The wireless signal processing component 11 sequentially decodes each path of received WBS data and, for ensuring synchronization of the multiple paths of speech data, the wireless signal processing component 11 caches the decoded data.

The wireless signal processing component 11 sequentially extracts the speech data of each wireless microphone 3 in the same time period from a cache, packs the extracted the speech data in the RTP packet format and forwards the packed speech data to the audio processing component on the host 1.

In the embodiment of the present disclosure, the host 1 keeps connected with each wireless microphone 3 by use of a Bluetooth Hands-Free Profile (HFP) protocol, transmits the WBS data by use of a Synchronous Connection Oriented (SCO) Bluetooth channel connection and transmits control and state data by use of an SPP. Technologies such as an "HFP" protocol, an "SCO Bluetooth channel" and the "SPP" are all standard specifications defined by the Bluetooth Special Interest Group, and these technologies a mature and stable and may be supported by many existing implementation solutions, so that difficulties in development and the workload are low.

For solving the same technical problems, another embodiment of the present disclosure provides an audio-video conference system, which includes the abovementioned wireless microphone control system.

In conclusion, the embodiments of the present disclosure provide a wireless microphone system, which includes a host 1, a wireless communication component 2 and multiple wireless microphones 3, and the host 1 includes a wireless signal processing component 11 and an audio signal processing component 12. Each wireless microphone is configured to acquire a sound signal, convert the sound signal into an audio signal and wirelessly transmit the audio signal to the wireless communication component 2. The wireless communication component 2 is configured to send the received audio signal to the host 1. The wireless signal processing component 11 is configured to receive the audio signal from the wireless communication component 2, perform signal processing on the audio signal to obtain speech data and send the speech data to the audio signal processing component 12. And the audio signal processing component 12 is configured to receive the speech data and perform data processing on the speech data to obtain sound data to be played for network transmission.

Compared with the related art, the at least some embodiments of the present disclosure have the following beneficial effects.

At one, through the wireless communication component 2, wireless connection between each wireless microphone 3 and the host 1 is implemented, thereby achieving the purpose of connecting the multiple wireless microphones 3 to the same host 1, further implementing wireless communication connection between each microphone and the host 1, avoiding the constraints of wires and facilitating improvement in user experiences.

At two, adopting the Bluetooth component of the host 1 with the multiple (two or more than two) wireless microphones 3 supporting Bluetooth through the Bluetooth component, thereby implementing the wireless communication connection between each microphone and the host 1, avoiding the constraints of the wires and facilitating improvement in the user experiences.

At three the control command and the state data can be bidirectionally transmitted between the host 1 and each multiple wireless microphone 3, the host 1 can control the states of all the wireless microphones 3, and the state data of the multiple wireless microphones 3 can be summarized to the host 1.

The above is the exemplary implementation mode of the present disclosure. It is to be pointed out that those of ordinary skill in the art may further make multiple improvements and embellishments without departing from the principle of the present disclosure and these improvements and embellishments shall also fall within the scope of protection of the present disclosure.

What is claimed is:

1. A wireless microphone system, comprising a host, a wireless communication component and a plurality of wireless microphones, the host comprising a wireless signal processing component and an audio signal processing component;

each wireless microphone of the plurality of wireless microphones, configured to acquire a sound signal, convert the sound signal into an audio signal and wirelessly transmit the audio signal to the wireless communication component;

the wireless communication component, configured to send the audio signal to the host;

the wireless signal processing component, configured to receive the audio signal from the wireless communication component, perform signal processing on the audio signal to obtain speech data and send the speech data to the audio signal processing component; and the audio signal processing component, configured to receive the speech data and perform data processing on the speech data to obtain sound data to be played for network transmission;

wherein the wireless communication component comprises a Bluetooth component, and the Bluetooth component is used for numbering the plurality of wireless microphones successfully paired with the Bluetooth component according to a preset connection sequence, establishing a plurality of audio data channels, receiving audio signals sent by the plurality of wireless microphones through the plurality of audio data channels and sequentially sending the audio signals to the host according to numbers of the plurality of wireless microphones.

2. The wireless microphone system as claimed in claim 1, wherein each wireless microphone comprises a pick-up, an audio signal processing circuit and a wireless signal transmission component, an output end of the pick-up is connected with an input end of the audio signal processing circuit, an output end of the audio signal processing circuit is connected with the wireless signal transmission component, and the wireless signal transmission component is wirelessly connected with the wireless communication component.

3. The wireless microphone system as claimed in claim 2, wherein the Bluetooth component is a built-in Bluetooth chip, and the built-in Bluetooth chip is connected with the wireless signal processing component; and the wireless signal transmission component of each wireless microphone is wirelessly connected with the built-in Bluetooth chip.

4. The wireless microphone system as claimed in claim 2, wherein the Bluetooth component is an external Bluetooth adapter, and the external Bluetooth adapter is connected with the wireless signal processing component, through a data interface in the host; and the wireless signal transmission component of each wireless microphone is wirelessly connected with the external Bluetooth adapter.

5. The wireless microphone system as claimed in claim 2, wherein each wireless microphone further comprises a wireless signal receiving component and a state controller configured to control power-on/off and a state of an indicator lamp, the wireless signal receiving component is wirelessly connected with the Bluetooth component, and an output end of the wireless signal receiving component is connected with the state controller.

6. A control method for the wireless microphone system as claimed in claim 2, comprising the following steps:
    numbering, by the Bluetooth component, the plurality of wireless microphones successfully paired with the Bluetooth component according to the preset connection sequence;
    establishing, by the Bluetooth component, an audio data channel between each wireless microphone and the Bluetooth component, the audio data channel being configured to transmit a path of coded and compressed wideband speech data; and
    receiving, by the Bluetooth component, audio signals sent by the plurality of wireless microphones and sequentially sending, by the Bluetooth component, an audio signal corresponding to each wireless microphone to the host according to numbers of the plurality of wireless microphones.

7. The control method for the wireless microphone system as claimed in claim 6, wherein after receiving, by the Bluetooth component, the audio signal sent by the plurality of wireless microphones and sequentially sending, by the Bluetooth component, the audio signal corresponding to each wireless microphone to the host according to the numbers of the plurality of wireless microphones, the method further comprises:
    performing, by the wireless signal processing component, signal processing on the sequentially received audio signal to obtain speech data and sending, by the wireless signal processing component the speech data to the audio signal processing component; and
    performing, by the audio signal processing component, data processing on the sequentially received speech data to obtain sound data to be transmitted through a network to a loudspeaker on the host, and played by the loudspeaker.

8. The control method for the wireless microphone system as claimed in claim 7, wherein performing, by the wireless signal processing component, the signal processing on the sequentially received audio signal to obtain the speech data and sending, by the wireless signal processing component, the speech data to the audio signal processing component comprises:
    decoding, by the wireless signal processing component, the sequentially received audio signal to obtain the speech data, caching, by the wireless signal processing component, the speech data, packing the speech data sent by each wireless microphone in the same time period in a Real Time Protocol (RTP) packet format and forwarding the packed speech data to the audio signal processing component.

9. An audio-video conference system, comprising the wireless microphone control system as claimed in claim 1.

* * * * *